(12) United States Patent
Walker et al.

(10) Patent No.: US 11,782,851 B2
(45) Date of Patent: Oct. 10, 2023

(54) DYNAMIC QUEUE DEPTH ADJUSTMENT (71) Applicant: Micron Technology, Inc., Boise, ID (US)

(72) Inventors: Robert M. Walker, Raleigh, NC (US); Kirthi Ravindra Kulkarni, San Jose, CA (US); Laurent Isenegger, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 17/463,995

(22) Filed: Sep. 1, 2021

(65) Prior Publication Data
US 2023/0060874 A1 Mar. 2, 2023

(51) Int. Cl.
*G06F 13/16* (2006.01)

(52) U.S. Cl.
CPC ................ *G06F 13/1642* (2013.01)

(58) Field of Classification Search
CPC .................................... G06F 13/1642
USPC ......................................... 710/112
See application file for complete search history.

(56) References Cited

U.S. PATENT DOCUMENTS

| 5,426,736 | A | * | 6/1995 | Guineau, III | G06F 13/385 |
| | | | | | 710/56 |
| 5,664,106 | A | * | 9/1997 | Caccavale | G06F 12/0866 |
| | | | | | 709/224 |
| 5,680,539 | A | * | 10/1997 | Jones | G06F 11/1435 |
| | | | | | 714/6.21 |
| 5,881,269 | A | * | 3/1999 | Dobbelstein | H04L 41/145 |
| | | | | | 719/331 |
| 6,088,767 | A | * | 7/2000 | Dan | G06F 12/122 |
| | | | | | 711/134 |
| 6,208,640 | B1 | * | 3/2001 | Spell | H04L 47/10 |
| | | | | | 370/468 |
| 6,421,723 | B1 | * | 7/2002 | Tawil | H04L 43/0876 |
| | | | | | 709/224 |
| 6,577,600 | B1 | * | 6/2003 | Bare | H04L 67/1001 |
| | | | | | 370/252 |
| 6,597,699 | B1 | * | 7/2003 | Ayres | H04L 47/30 |
| | | | | | 370/469 |
| 6,678,271 | B1 | * | 1/2004 | Flinsbaugh | H04L 47/30 |
| | | | | | 370/480 |
| 6,959,374 | B2 | * | 10/2005 | Schulz | G06F 12/0862 |
| | | | | | 711/213 |
| 7,739,470 | B1 | * | 6/2010 | Norgren | G06F 11/3409 |
| | | | | | 709/224 |
| 8,555,343 | B2 | * | 10/2013 | Yang | G06F 21/577 |
| | | | | | 726/3 |
| 8,935,490 | B1 | * | 1/2015 | Naamad | G06F 3/0659 |
| | | | | | 711/E12.003 |
| 9,699,032 | B2 | | 7/2017 | Niestemski et al. | |
| 10,255,217 | B2 | | 4/2019 | Pendharkar et al. | |
| 10,313,219 | B1 | * | 6/2019 | Burcham | H04W 24/08 |
| 2003/0035385 | A1 | * | 2/2003 | Walsh | H04B 7/18586 |
| | | | | | 370/316 |

(Continued)

*Primary Examiner* — Paul R. Myers
(74) *Attorney, Agent, or Firm* — Brooks, Cameron & Huebsch, PLLC (57) ABSTRACT

A method includes determining a traffic pattern of access requests within a queue or a system, or both and dynamically adjusting, within a particular range, a queue depth of the queue based on the determined traffic pattern of access requests to balance bandwidth and latency associated with executing the access requests.

20 Claims, 5 Drawing Sheets

(56) References Cited

U.S. PATENT DOCUMENTS

| | | | |
|---|---|---|---|
| 2004/0193397 A1* | 9/2004 | Lumb | G06F 13/105 703/24 |
| 2004/0194095 A1* | 9/2004 | Lumb | G06F 9/4887 718/100 |
| 2005/0157723 A1* | 7/2005 | Kim | H04L 47/10 370/395.21 |
| 2006/0221974 A1* | 10/2006 | Hilla | H04L 47/30 370/412 |
| 2007/0086483 A1* | 4/2007 | Greenberg | H04L 47/20 370/468 |
| 2007/0121499 A1* | 5/2007 | Pal | H04L 45/60 370/417 |
| 2007/0198750 A1* | 8/2007 | Moilanen | G06F 9/5083 710/6 |
| 2008/0267203 A1* | 10/2008 | Curcio | H04L 49/90 370/412 |
| 2009/0059913 A1* | 3/2009 | Duato Marin | H04L 49/1507 370/389 |
| 2009/0070879 A1* | 3/2009 | Saika | G06F 21/566 726/24 |
| 2010/0150120 A1* | 6/2010 | Schlicht | H04W 4/23 370/338 |
| 2010/0191876 A1* | 7/2010 | Muppirala | G06F 3/067 710/39 |
| 2011/0307636 A1* | 12/2011 | Wewel | G06F 3/0689 710/56 |
| 2012/0039173 A1* | 2/2012 | Danzig | H04L 47/2441 370/235 |
| 2013/0111175 A1* | 5/2013 | Mogul | H04L 47/10 711/E12.001 |
| 2014/0325164 A1* | 10/2014 | Thompson | G06F 3/0611 711/154 |
| 2014/0359638 A1* | 12/2014 | de Lima | G06F 9/546 719/313 |
| 2015/0016278 A1* | 1/2015 | Hayes | H04L 41/0803 370/249 |
| 2015/0242133 A1* | 8/2015 | Smith | G06F 3/0613 711/114 |
| 2015/0373017 A1* | 12/2015 | Oelke | H04L 63/0807 710/17 |
| 2016/0299697 A1* | 10/2016 | Chen | G06F 3/0611 |
| 2017/0357600 A1* | 12/2017 | Moon | G06F 12/0891 |
| 2018/0074743 A1 | 3/2018 | Jeter et al. | |
| 2018/0165238 A1* | 6/2018 | Depew | G06F 11/349 |
| 2018/0253256 A1* | 9/2018 | Bharadwaj | G06F 3/067 |
| 2019/0052532 A1* | 2/2019 | Chen | H04L 47/781 |
| 2020/0066331 A1* | 2/2020 | Hu | G06F 13/1673 |
| 2020/0174938 A1* | 6/2020 | Shergill | G06F 12/0871 |
| 2020/0409878 A1* | 12/2020 | Liu | G06F 13/1668 |

* cited by examiner

DYNAMIC QUEUE DEPTH ADJUSTMENT

TECHNICAL FIELD

Embodiments of the disclosure relate generally to memory sub-systems, and more specifically, relate to dynamic queue depth adjustment.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to dynamic queue depth adjustment, in particular to host systems and/or memory sub-systems that include a queue depth adjustment component to dynamically adjust a queue depth of one or more queues based on various traffic patterns. A memory sub-system can be a storage system, storage device, a memory module, or a combination of such. Example memory modules include dynamic random access memory (DRAM) modules such as dual in-line memory modules (DIMMs) that can support a compute express link (CXL) interconnect standard. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can command data to be retrieved from the memory sub-system.

The host system and/or the memory sub-system can include a queue that temporarily stores access requests (e.g., read or write requests) prior to the access requests being issued (e.g., outputted from the queue) to be executed. A size of the queue (e.g., a quantity of access requests that are waiting to be executed in the queue) often can be an important factor balancing between the bandwidth and the latencies associated with executing access requests to improve the performance of the memory sub-system. As used herein, a size of a queue can be referred to as a queue depth. For example, the queue can be a bottleneck when the queue depth of the queue is relatively low for the backend device (e.g., memory device(s) of the memory sub-system) that executes the access requests, which results in underutilization of the memory sub-system. While the increased queue depth can further increase the bandwidth, the bandwidth that has been increased along with the increased queue depth can saturate (e.g., may not increase further) at some point as the backend device may not provide further capability of executing the increased quantity of access requests, which can reduce/eliminate benefits obtainable from the increased queue depth. Rather, the increased queue depth can often increase the latencies associated with executing access requests. Accordingly, it can be beneficial to find an optimal queue depth to maximize the bandwidth while mitigating latencies associated with executing access requests to improve the performance of the memory sub-system.

However, the optimal queue depth can change depending on a quantity of respective types of access requests (e.g., read or write requests) enqueued in the queue, which can make determining the optimal queue depth challenging as the quantity of respective types of access requests can change as the memory sub-system operates. Therefore, the optimal queue depth that may be predetermined and applied throughout the operation of the host system and/or the memory sub-system might indeed not provide the optimal queue depth for the host system and/or the memory sub-system that are operating.

Aspects of the present disclosure address the above and other deficiencies by providing dynamic queue depth adjustment scheme to dynamically adjust the queue depth and ensure that the queue depth being dynamically adjusted continuously serves as the optimal queue depth as the host system and/or the memory sub-system operates. This can prevent the queue depth being the bottleneck and allow higher bandwidth with lower latency during the operation of the host system and/or the memory sub-system to improve the performance of the memory sub-system.

Adjusting the queue depth can provide dynamic throttling, in which the speed at which read/write requests are processed at the host system and/or the memory sub-system is dynamically increased/decreased to meet various performance/endurance requirements of the host system and/or the memory sub-system. In some embodiments, the queue depth can be adjusted based on a traffic pattern of the host system and/or the memory sub-system. The traffic pattern can be determined based on various parameters, such as a quantity of access requests previously received at the host system and/or the memory sub-system (e.g., over a particular period of time), a quantity of respective types of access requests enqueued (e.g., waiting) in the queues, a particular quantity of respective types of access requests last received at the host system and/or the memory sub-system, and/or latencies associated with executing access requests at the memory sub-system, and/or spatial locality of sequential access or random access, or both, associated with access requests.

Figure 1:
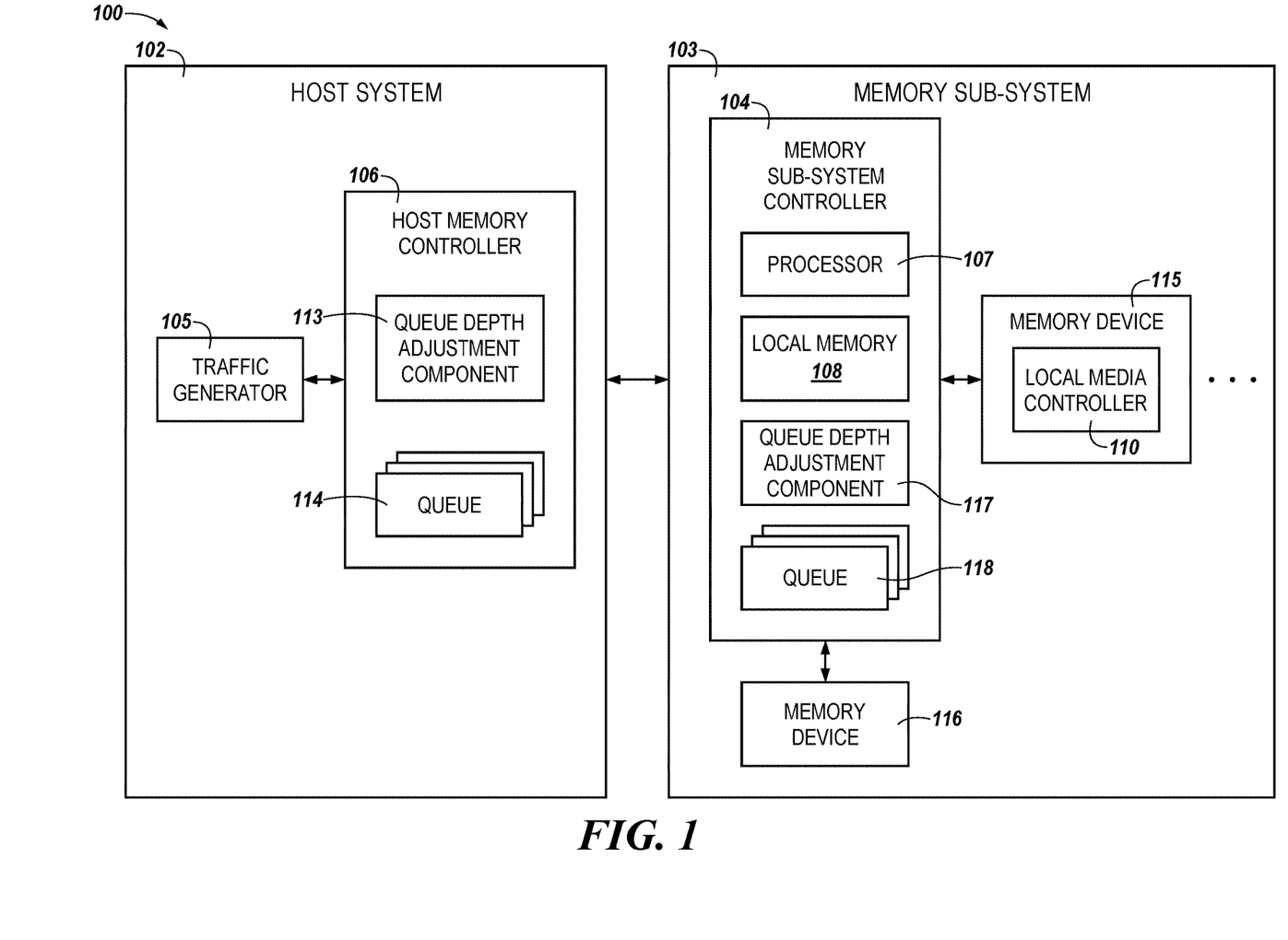
FIG. 1 illustrates an example computing system that includes a memory sub-system in accordance with some embodiments of the present disclosure.

FIG. 1 illustrates an example computing system 100 that includes a memory sub-system 103 in accordance with some embodiments of the present disclosure. The memory sub-system 103 can include media, such as one or more volatile memory devices (e.g., memory device 116), one or more non-volatile memory devices (e.g., memory device 115), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can include a host system 102 that is coupled to one or more memory sub-systems 103. In some embodiments, the host system 102 is coupled to different types of memory sub-system 103. FIG. 1 illustrates one example of a host system 102 coupled to one memory sub-system 103. The host system 102 uses the memory sub-system 103, for example, to write data to the memory sub-system 103 and read data from the memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. The host system 102 can include a traffic generator 105 and a host memory controller 106. The traffic generator 105 can include a processor chipset (e.g., CPU chipset) and a software stack executed by the processor chipset. The processor chipset can include one or more cores and/or one or more caches. The traffic generator 105 can further include a buffer (not illustrated in FIG. 1) that initially stores host commands received at the host system 102 prior to being sent to the host memory controller 106.

The host memory controller 106 can operate as a storage protocol controller (e.g., PCIe controller, SATA controller, CXL controller). The host memory controller 106 can include a queue depth adjustment component 113 (e.g., coupled to) and one or more queues 114.

The queue 114 can be configured to store commands in various manners. In one example, the queue 114 can be configured to store commands regardless of respective types of the commands (e.g., regardless of whether the commands are of read or write). In another example, the queues 114 can be configured to store commands of respective types. For example, one of the queues 114 can be configured to store write commands, while another one of the queues 114 can be configured to store read commands. In some embodiments, the queue 114 can be a first-in, first-out (FIFO) queue that operates based on a FIFO policy.

The host system 102 can be coupled to the memory sub-system 103 via a physical host interface (e.g., located on the host memory controller 106). Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access components (e.g., memory devices 115) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

In some embodiments, the host memory controller 106 can be a Compute Express Link (CXL) compliant controller and include (and/or closely coupled to) the physical host interface that operates according to PCIe/CXL protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The memory devices 115, 116 can include any combination of the different types of non-volatile memory devices and/or volatile memory devices. The volatile memory devices (e.g., memory device 116) can be, but are not limited to, random access memory (RAM), such as dynamic random-access memory (DRAM) and synchronous dynamic random access memory (SDRAM).

Some examples of non-volatile memory devices (e.g., memory device 115) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array.

Although non-volatile memory components such as three-dimensional cross-point arrays of non-volatile memory cells and NAND type memory (e.g., 2D NAND, 3D NAND) are described, the memory device 115 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

In some embodiments, the memory device 115 can be a FeRAM memory device 115 and the memory device 116 can be a DRAM memory device. In this example, the memory sub-system controller 104 can manage a ferroelectric memory device 115 and a DRAM memory device 116. Further, in some embodiments, instead of managing both a FeRAM memory device 115 and a DRAM memory device 116 and a, the memory controller 104 can be configured to manage either just FeRAM memory devices 115 or just DRAM memory devices 116.

The memory sub-system controller 104 (or controller 104 for simplicity) can communicate with the memory devices 115 to perform operations such as reading data, writing data, or erasing data at the memory devices 115 and other such operations. The memory sub-system controller 104 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 107 (e.g., a processing device) configured to execute instructions stored in a local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory device 115 and/or the memory device 116. In some embodiments, the memory sub-system controller 104 can include an interface (e.g., at a front end of the memory sub-system controller 104) that includes a flexible bus interconnect and use CXL protocol layers (including CXL.io, CXL.mem, and CXL.cache) to couple the memory sub-system controller 104 to the host system 102, such as the host memory controller 106 that is a CXL compliant controller.

The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 115. The memory sub-system controller 104 can further include host interface circuitry to communicate with the host system 102 via the physical host interface. The host interface circuitry can convert the commands received from the host system into command instructions to access the memory device 115 and/or the memory device 116 as well as convert responses associated with the memory device 115 and/or the memory device 116 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory device 115 and/or the memory device 116.

In some embodiments, the memory device 115 includes local media controllers 110 that operate in conjunction with memory sub-system controller 104 to execute operations on one or more memory cells of the memory devices 115. An external controller (e.g., memory sub-system controller 104) can externally manage the memory device 115 (e.g., perform media management operations on the memory device 115). In some embodiments, a memory device 115 is a managed memory device, which is a raw memory device combined with a local controller (e.g., local media controller 110) for media management within the same memory device package. An example of a managed memory device is a managed NAND (MNAND) device.

The memory sub-system 103 can include one or more queues 118. The queues 118 can be configured to store commands (received from the host memory controller 106) in various manners. In one example, the queue 118 can be configured to store commands regardless of respective types of the commands (e.g., regardless of whether the commands are of read or write). In another example, the queues 118 can be configured to store commands of respective types. For example, one of the queues 118 can be configured to store write commands, while another one of the queues 118 can be configured to store read commands. In some embodiments, the queues 118 can be a first-in, first-out (FIFO) queue that operates based on a FIFO policy.

As used herein, the host memory controller 106 and/or the memory sub-system controller 104 can be individually and/or collectively referred to as a control component. For example, the control component can refer to the host memory controller 106 or the memory sub-system controller 104, or both.

The host system 102 and the memory sub-system 103 can each include a queue depth adjustment component 113 and 117, respectively. In some embodiments, the memory sub-system controller 104 includes at least a portion of the queue depth adjustment component 117. For example, the memory sub-system controller 104 can include a processor 107 (processing device) configured to execute instructions stored in local memory 110 for performing the operations described herein. In some embodiments, the memory device 115 includes at least a portion of the queue depth adjustment component 117. In some embodiments, the queue depth adjustment component 113 is part of the host system 102, an application, or an operating system. In some embodiments, the queue depth adjustment components 113 and/or 117 can include special purpose circuitry in the form of an ASIC, FPGA, state machine, and/or other logic circuitry that can allow the queue depth adjustment component 117 to orchestrate and/or perform operations described herein.

Although not shown in FIG. 1 so as to not obfuscate the drawings, the queue depth adjustment components 113 and/or 117 can include various circuitry to facilitate determining a traffic pattern of access requests through the host system 102 (e.g., the traffic generator 105 and/or the host memory controller 106), the memory sub-system 103 (e.g., the memory sub-system controller 104), or the respective queue 114 and/or 118 and adjusting a queue depth of the respective queue 114 and/or 118, respectively, based on the determined traffic pattern. The traffic pattern can be determined based on various parameters. In one example, the traffic pattern can be determined by tracking a quantity of respective types of access requests previously received at, for example, the host memory controller 106 and/or the memory sub-system controller 104 over a particular period of time. In another example, the traffic pattern can be determined by tracking a quantity of respective types of access requests enqueued in the queues 114 and/or 118. In a different example, the traffic pattern can be determined by tracking a quantity of access requests among a particular quantity of access requests last received at the host memory controller 106 and/or memory sub-system controller 104. In a different example, the traffic pattern can be determined based on latencies associated with executing access requests at the memory sub-system 103. In a different example, the traffic pattern can be determined based on spatial locality of sequential access or random access, or both, associated with access requests. In some embodiments, tracking a quantity of respective types of access requests can include tracking a ratio of a quantity of access requests of a particular type to a total quantity of access requests (e.g., received at the host memory controller 106 and/or the memory sub-system controller 104 over a particular period of time, enqueued in the queues 114 and/or 118, and/or last received at the host memory controller 106 and/or the memory sub-system controller 104 over a particular period of time) regardless of respective types.

A better dynamic measurement of the optimal value of the queue depth can be provided when the determined traffic pattern is reflection of a recent trend of access requests received at the host memory controller 106 and/or the memory sub-system controller 104. For example, determining the traffic pattern based on an overall quantity of access requests being executed and previously received at the host memory controller 106 and/or the memory sub-system controller 104 might not properly reflect a recent trend of the traffic pattern. For example, consider a situation where the host memory controller 106 and/or the memory sub-system controller 104 receives substantially more quantity of read requests initially (e.g., 10000 read requests) over a quantity of write requests (e.g., 100 write requests) than at a later point. In this example, even when the host memory controller 106 and/or the memory sub-system controller 104 later receives substantially less quantity of read requests than a quantity of write requests, the overall read ratio (e.g., a ratio of a quantity of read requests to a total quantity of read and write requests) can still substantially reflect and/or biased toward the initial read ratio (e.g., 10000 read requests vs 100 write requests) as the later read ratio might not hugely affect the overall read ratio. Therefore, in this example, despite that the host memory controller 106 and/or the memory sub-system controller 104 are desired to be operated with the queue depth adjusted based on the recent read ratio, which can be substantially less than the overall read ratio, they might still be operated with the queue depth adjusted based on the overall read ratio. To operate the host memory controller 106 and/or the memory sub-system controller 104 with the queue depth adjusted based on the recent read ratio, accordingly, the queue depth can be adjusted based on a particular quantity of access requests last received (e.g., 6) at the host memory controller 106 and/or the memory sub-system controller 104.

Figure 2:
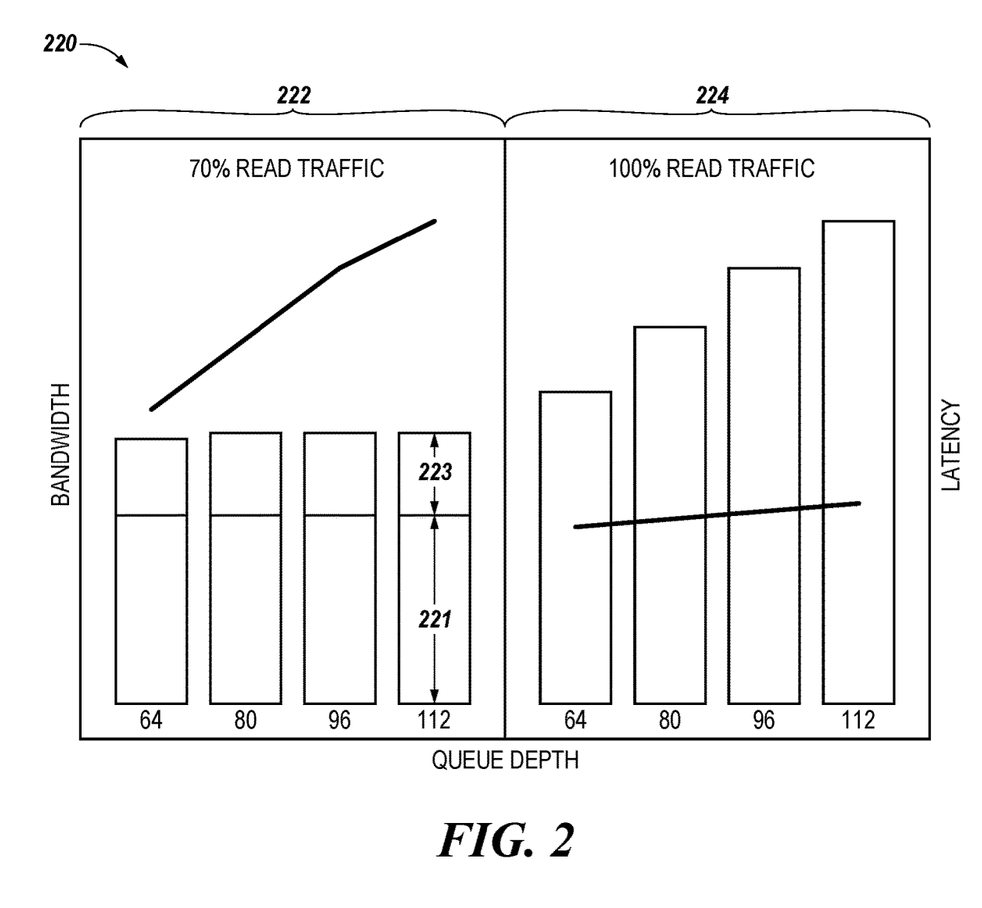
FIG. 2 is a graph illustrating changes in a bandwidth and a latency in relation to various queue depths associated with executing access requests in accordance with some embodiments of the present disclosure.

FIG. 2 is a graph 220 illustrating changes in a bandwidth and a latency in relation to various queue depths associated with executing access requests in accordance with some embodiments of the present disclosure. A portion 222 (e.g., left side) of the graph 220 illustrates a bandwidth (illustrated as bars in FIG. 2) and a latency (illustrated as a line in FIG. 2) associated with executing access requests in relation to various queue depths when read traffic is 70% (e.g., 70% of access requests received at a control component (e.g., the host memory controller 106 and/or the memory sub-system controller 104 illustrated in FIG. 1) from the traffic generator 105 illustrated in FIG. 1 are read requests) and/or the queues 114 and/or 118. The bars 221 at the respective queue depths 64, 80, 96, and 112 illustrate the respective bandwidth associated with executing read requests and the bars 223 at the respective queue depths 64, 80, 96, and 112 illustrate the respective bandwidth associated with executing write requests. A portion 224 (e.g., right side) of the graph 220 illustrates a bandwidth (illustrated as bard in FIG. 2) and a latency (illustrated as a line in FIG. 2) associated with executing access requests in relation to various queue depths when read traffic is 100% (e.g., 100% of access requests received at the control component from the traffic generator 105 illustrated in FIG. 1 are read requests).

As illustrated in the portion 222, the bandwidth (e.g., the bars 221 and 223) remains the same despite that the queue depth increases from 64 to 112. On the other hand, the latency associated with executing access requests increases as the queue depth increases. Therefore, the optimal value for balancing the bandwidth and the latency can be determined to be 64 as the increased queue depth confers no benefits.

As illustrated in the portion 224, the bandwidth increases as the queue depth increases from 64 to 112. Increasing the queue depth also causes the latency to be increased as illustrated in the portion 224; however, the latency increases at a comparably slower rate than the bandwidth does. Therefore, the benefits of the increased queue depth can outweigh the cost of the increased queue depth and the optimal value for balancing the bandwidth and the latency can be determined to be 112. As illustrated in FIG. 2, the optimal queue depth can change depending on a percentage of (e.g., a ratio of) a quantity of access requests of a particular type (e.g., read requests) to a total quantity of access requests. Therefore, dynamically adjusting queue depth to the optimal queue depth during the operation of the host system 102 and/or the memory sub-system 103 is desired.

Figure 3:
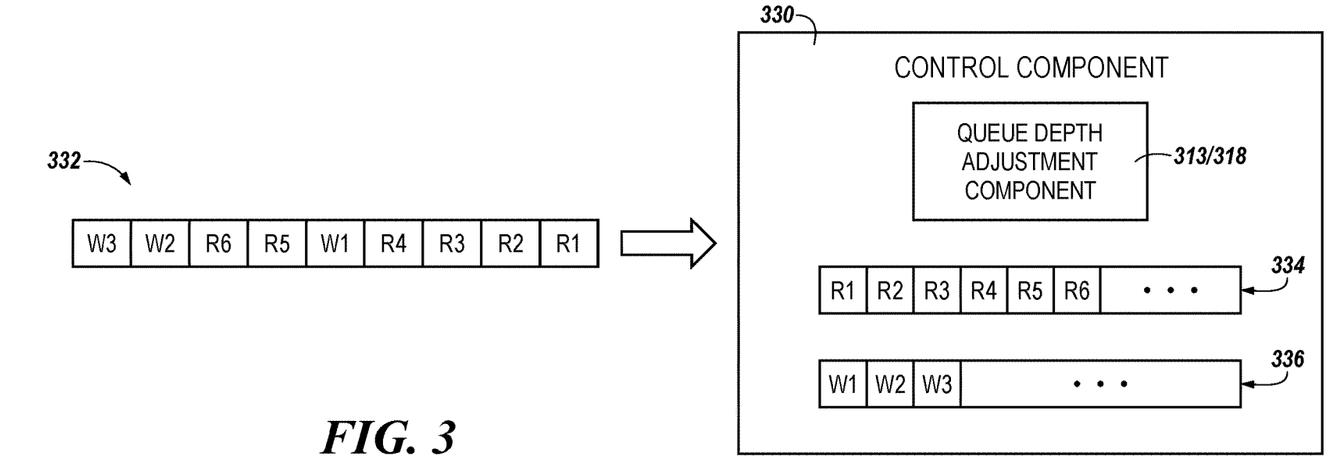
FIG. 3 illustrates an example of a read request queue and a write request queue for receiving a stream of access requests in accordance with some embodiments of the present disclosure.

FIG. 3 illustrates an example of a read request queue 334 and a write request queue 336 for receiving a stream of access requests in accordance with some embodiments of the present disclosure. As described herein, the host memory controller 106 and/or the memory sub-system controller 104 illustrated in FIG. 1 can be individually and/or collectively referred to as a control component (e.g., the control component 330). For example, the control component can refer to the host memory controller 106 or the memory sub-system controller 104, or both. Further, the read request queue 334 and the write request queue 336 can be one of queues 114 and/or 118 illustrated in FIG. 1 and the queue depth adjustment component 313/318 can be analogous to the queue depth adjustment component 113/118, respectively, illustrated in FIG. 1.

As illustrated in FIG. 3, a stream of access requests 332 can be received in an order of a read command R1, a read command R2, a read command R3, a read command R4, a write command W1, a read command R5, a read command R6, a write command W2, and a write command W3 at the control component 330. The control component 330 can insert the access requests into respective empty queues 334 and 336 based on a respective type of each access request. For example, the control component 330 can insert read commands in an order of R1 to R6 to the read request queue 334 and write commands in an order of W1 to W3 to the write request queue 336.

As the access requests of the stream 332 are being received at the control component 330, a read ratio (herein sometimes referred to as a rolling average read ratio) of a quantity of read requests to a total quantity of access requests received at the control component 330 changes. The queue depth adjustment component 313/318 can be configured to adjust, for example, a queue depth of the read request queue 334 based on the ratio. Below is a Table 1 illustrating a rolling average read ratio that is changing as the access requests of the stream 332 are being received. Table 1 further illustrates a queue depth of the read request queue 334 ("READ QD") that is being adjusted as the rolling average read ratio is being changed. For example, the ratio remains to be 1 for first four access requests as they are all read requests. The ratio becomes less than 1 as the control component 332 starts receiving write requests. For example, the ratio (e.g., read ratio) becomes 0.8 (four read requests/five total access requests) when the write request W1 is received; the ratio becomes 0.83 (five read requests/six total access requests) when the write request R5 is received; the ratio becomes 0.86 (six read requests/seven total access requests) when the write request R6 is received; the ratio becomes 0.75 (six read requests/eight total access requests) when the write request W2 is received; and the ratio becomes 0.66 (six read requests/nine total access requests) when the write request W3 is received.

TABLE 1

| REQUEST | READ QD | Rolling Average Read Ratio |
|---|---|---|
| R1 | 112 | 1 |
| R2 | 112 | 1 |
| R3 | 112 | 1 |
| R4 | 112 | 1 |
| W1 | 90 | 0.8 |
| R5 | 93 | 0.83 |
| R6 | 96 | 0.86 |
| W2 | 84 | 0.75 |
| W3 | 74 | 0.66 |

A queue depth of the read request queue 334 can be adjusted proportional to the ratio. For example, if a range of queue depths of the read request queue 334 is assumed to be from 64 (lower marginal value) to 112 (upper marginal value), the ratio of 1 can correspond to a queue depth of 112. Continuing with this example, the queue depth of the read request queue 334 can be adjusted to 90 when the ratio is changed to 0.8 (112*0.8=89.6, which can be rounded to 90); 93 when the ratio is changed to 0.83 (112*0.83=92.96, which can be rounded to 93); 96 when the ratio is changed to 0.86 (112*0.86=96.32, which can be rounded to 96); 84 when the ratio is changed to 0.75 (112*0.75=84); 93 when the ratio is changed to 0.75 (112*0.75=84); and 74 when the ratio is changed to 0.66 (112*0.66=73.92, which can be rounded to 74).

Figure 4:
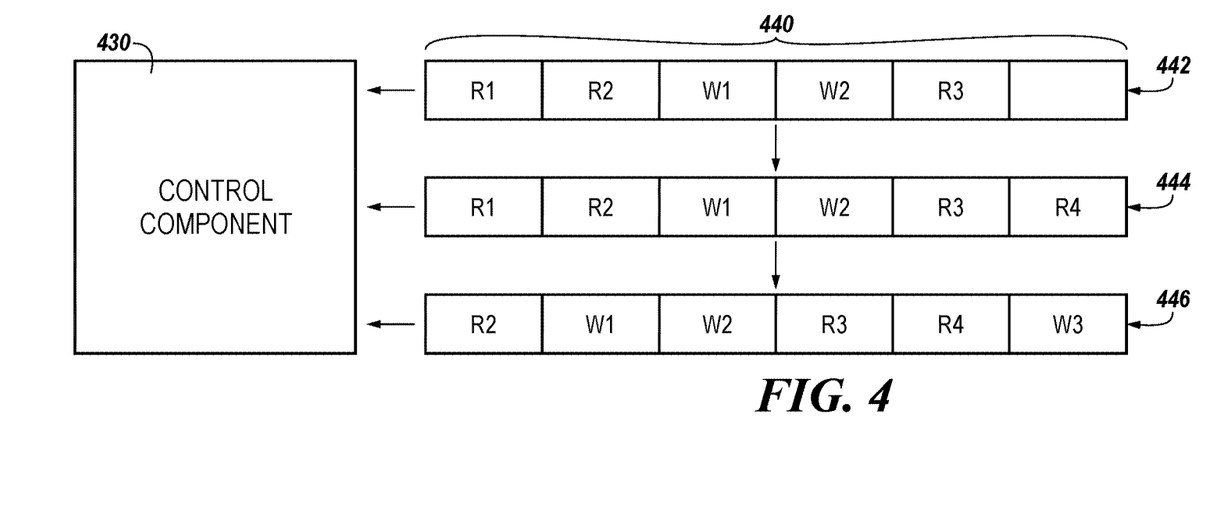
FIG. 4 illustrates an example of a number of access requests last received at a control component at different times in accordance with some embodiments of the present disclosure.

FIG. 4 illustrates an example of a number of access requests last received at a control component 430 at different times 432, 434, and 436 in accordance with some embodiments of the present disclosure. As described herein, the host memory controller 106 and/or the memory sub-system controller 104 illustrated in FIG. 1 can be individually and/or collectively referred to as a control component (e.g., the control component 430). For example, the control component can refer to the host memory controller 106 or the memory sub-system controller 104, or both.

Unlike the example illustrated in FIG. 3, in which all of the access requests received at the control component 330 were tracked, the control component 440 tracks those access requests corresponding to the window 440 only in the example illustrated in FIG. 4. In the example illustrated in FIG. 4, a size of the window 440 is six; however, embodiments are not limited to a particular window size.

As illustrated at 442 of FIG. 4, the window 440 includes five access requests that were received at the control component 430 in an order of a read request R1, a read request R2, a write request W1, a write request W2, and a read request R3. At 434, the window 440 includes six access requests as a read request R4 is newly received. At 436, as a new write request W3 has been received at the control component 430, the read request R1 is no longer tracked as part of the window 440.

The control component 430 can use the tracked quantities to adjust a queue depth of one or more queues (e.g., the queues 114, 118, 334, and/or 336 illustrated in FIG. 1 and FIG. 3, respectively). For example, the control component 430 can dynamically adjust a queue depth of a queue (e.g., the queue 114, 118, 334, and/or 336 illustrated in FIG. 1 and FIG. 2, respectively) proportional to a ratio of the tracked quantity of read requests of the window 440 to the size of the window 440 (e.g., also referred to as a read ratio) as the read ratio changes from 442 to 446, which can result in an increase of the queue depth from 442 to 444 (as the read ratio increases from 3/5 to 4/6) and a decrease of the queue depth from 444 to 446 (as the read ratio decreases from decreases from 4/6 to 3/6).

In a non-limiting example, adjusting a queue depth proportional to a read ratio can include multiplying an upper marginal value (e.g., maximum value) of the queue depth by the read ratio and adjusting the queue depth to the result of the multiplication. For example, if the queue depth can range from 64 (lower marginal value) to 112 (upper marginal value), the control component 430 can adjust a queue depth (if rounded off) to 67 and 75, respectively at 442 and 444. At 446, the control component 430 can adjust the queue depth to 64 (instead of 56, which is a result of the multiplication of the marginal value and the read ratio at 446) so as not to lower the queue depth below the lower marginal value of the queue depth of 64.

In a non-limiting example, a system (e.g., the computing system 100 illustrated in FIG. 1) can include a control component (e.g., the host memory controller 106 and/or the memory sub-system controller 104 illustrated in FIG. 1) that further includes a queue (e.g., the queue 114 and/or 118 illustrated in FIG. 1). The control component can be configured to balance bandwidth and latency associated with executing access requests in the queue based on a traffic pattern of the access requests in the queue. The control component can be further configured to track, during operation of the control component, a ratio of a quantity of access requests of a first type among a particular quantity of access requests of the first type or a second type last received at the control component to the particular quantity of access requests. The control component can be further configured to dynamically adjust, within a particular range, a queue depth of the queue proportional to the tracked ratio.

In some embodiments, the particular range ranges from a first marginal value and a second marginal value greater than the first marginal value. The control component can be configured to dynamically multiply the first marginal value by the tracked ratio and dynamically adjust the queue depth of the queue to a result of the multiplication in response to the result being within the particular range.

In some embodiments, the control component can include a first queue configured to store access requests of a first type and a second queue configured to store access requests of a second type. In this example, the control component can be configured to dynamically adjust, within the particular range, a queue depth of the first queue based on the ratio of the determined quantity of access requests of the first type to the particular quantity of access requests last received at the control component.

In some embodiments, the control component can be configured to increase the queue depth of the queue in response to the ratio being increased and decrease the queue depth of the queue in response to the ratio being decreased. In some embodiments, the control component can be configured to increase or decrease, to dynamically adjust the queue depth of the queue, the queue depth of the queue. In this example, the control component can be further configured to prevent the queue depth of the queue from being decreased below a first marginal value of the range and from being increased above a second marginal value of the range.

In some embodiments, the control component can be configured to dynamically adjust the queue depth of the queue for every X access requests received to the queue. In some embodiments, the queue can be a first-in, first-out (FIFO) queue.

In another non-limiting example, a system (e.g., the computing system 100 illustrated in FIG. 1) can include a control component (e.g., the host memory controller 106 and/or the memory sub-system controller 104 illustrated in FIG. 1) that further includes a queue (e.g., the queue 114 and/or 118 illustrated in FIG. 1). The control component can be configured to balance bandwidth and latency associated with executing access requests in the queue based on a traffic pattern of the access requests in the queue. The control component can be further configured to track, during operation of the control component, a particular quantity of access requests last received at the control component and a quantity of access requests of a first type among the particular quantity of access requests. The control component can be further configured to dynamically determine a first queue depth that is proportional to a ratio of the tracked quantity of access requests of the first type to the particular quantity of access requests last received at the control component. The control component can be further configured to dynamically adjust a first queue depth of the queue depth to the first queue depth in response to the determined second queue depth being within a particular range.

In some embodiments, the particular range ranges from a first marginal value to a second marginal value greater than the first marginal value. In this example, the control component can be further configured to dynamically adjust the second queue depth to the first marginal value in response to the determined first queue depth being equal to or less than the first marginal value. The control component can be further configured to dynamically adjust the second queue depth to the second marginal value in response to the determined first queue depth being equal to or greater than the second marginal value.

In some embodiments, the control component can be configured to multiply, to determine the first queue depth that is proportional to the ratio, the second queue depth by the ratio. In this example, a result of the multiplication can correspond to the first queue depth.

Figure 5:
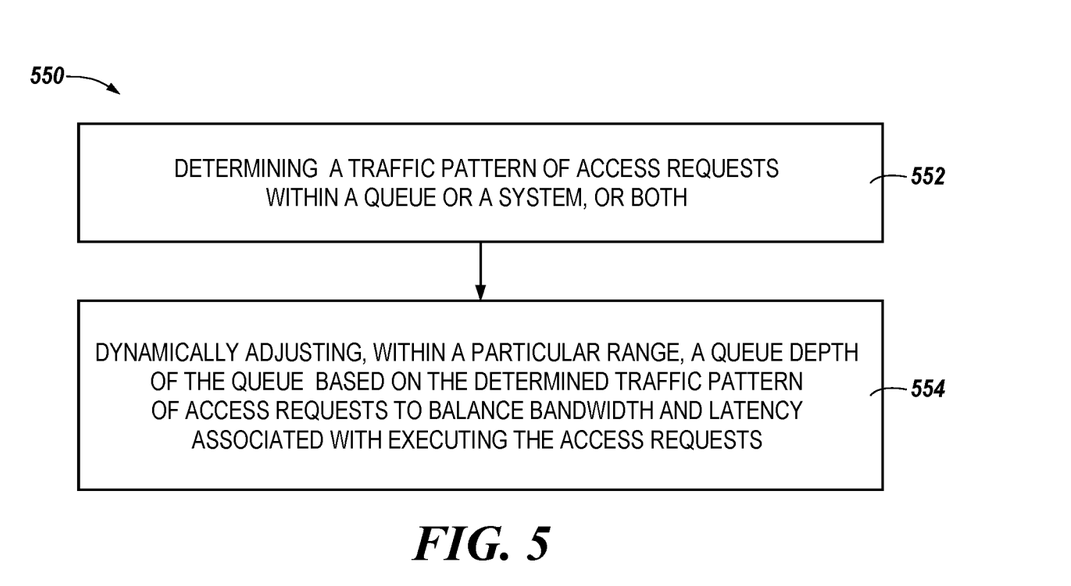
FIG. 5 is a flow diagram corresponding to a method for dynamic queue depth adjustment in accordance with some embodiments of the present disclosure.

FIG. 5 is a flow diagram corresponding to a method 550 for dynamic queue depth adjustment in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the queue depth adjustment components 113 and/or 117 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 552, a traffic pattern of access requests within a queue (e.g., queues 114 and/or 118 illustrated in FIG. 1) or a system (such as a control component, which can be the host memory controller 106 or the memory sub-system controller 104, or both), or both can be determined. At 554, a queue depth of the queue can be dynamically adjusted, within a particular range, based on the determined traffic pattern of access requests to balance bandwidth and latency associated with executing the access requests. In some embodiments, the queue depth of the queue can be prevented from being adjusted beyond the particular range.

In some embodiments, the traffic pattern of access requests can be determined by tracking, as the system receives a first quantity of access requests over a particular period of time, a ratio of a second quantity of access requests of a particular type among the first quantity of access requests to the first quantity of access requests. In this example, the queue depth of the queue can be dynamically adjusted, within the particular range, based on the ratio as the ratio changes. For example, the queue depth of the queue can be increased responsive to the ratio being increased and decreased responsive to the ratio being decreased.

In some embodiments, the traffic pattern of access requests within the queue or the system, or both further can be determined by tracking a quantity of access requests of a particular type among a particular number of access requests last received at the system. In this example, the queue depth of the queue can be dynamically adjusted, within the particular range, based on the tracked quantity of access requests of the particular type.

In some embodiments, the traffic pattern of access requests within the queue or the system, or both further can be determined by determining spatial locality of sequential access or random access, or both associated with the access requests. In this example, the queue depth of the queue can be dynamically adjusted, within the particular range, based on the determined spatial locality of sequential access or random access, or both associated with the access requests.

In some embodiments, the traffic pattern of access requests within the queue or the system, or both further can be determined by monitoring latency associated with executing the access requests. In this example, the queue depth of the queue can be dynamically adjusted, within the particular range, based on the monitored latency.

Figure 6:
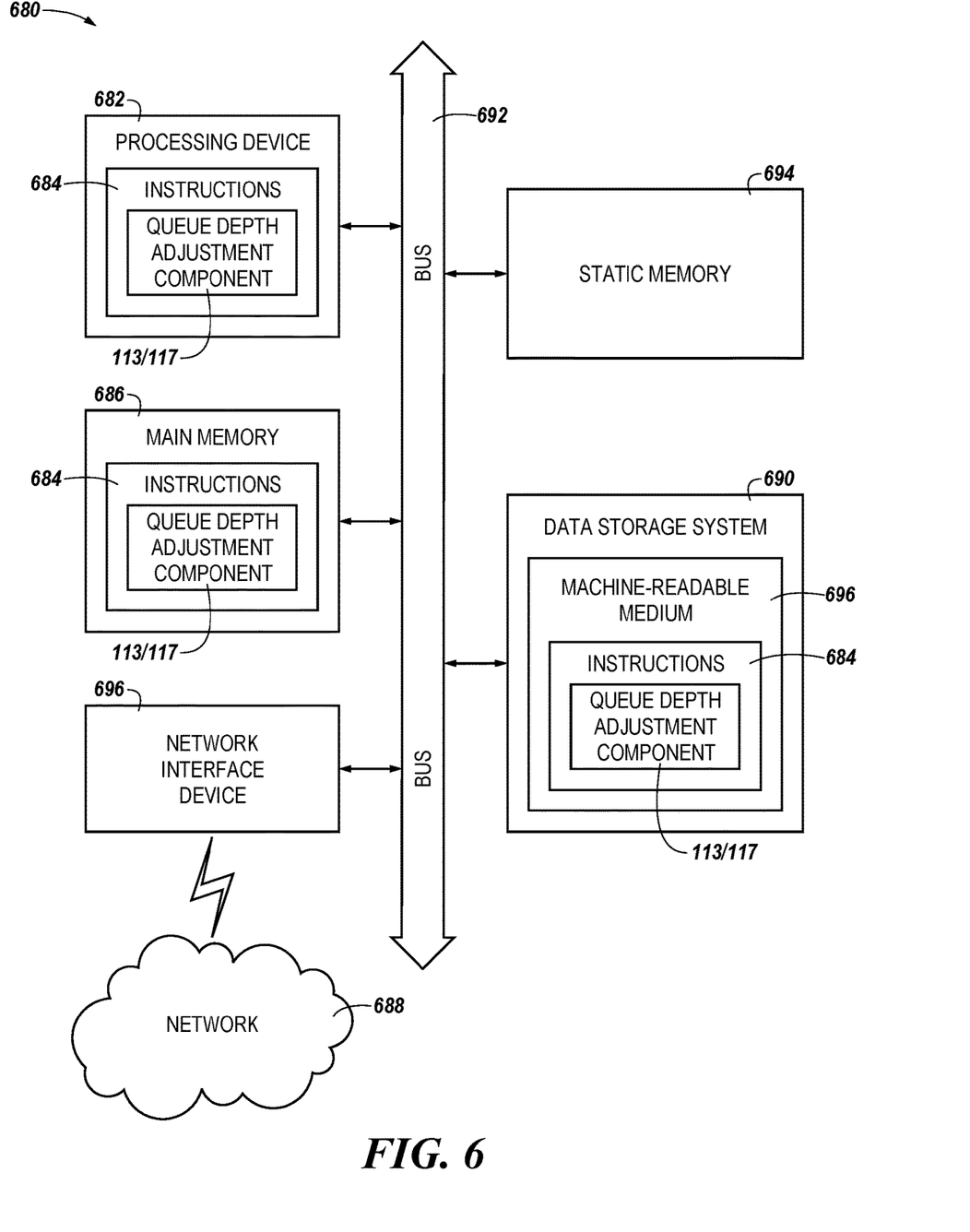
FIG. 6 is a block diagram of an example computer system in which embodiments of the present disclosure may operate.

FIG. 6 is a block diagram of an example computer system 680 in which embodiments of the present disclosure may operate. For example, FIG. 6 illustrates an example machine of a computer system 680 within which a set of instructions, for causing the machine to perform any one or more of the methodologies discussed herein, can be executed. In some embodiments, the computer system 680 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the queue depth adjustment components 113 and/or 117 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 680 includes a processing device 682, a main memory 686 (e.g., read-only memory (ROM), flash memory, dynamic random access memory (DRAM) such as synchronous DRAM (SDRAM) or Rambus DRAM (RDRAM), etc.), a static memory 694 (e.g., flash memory, static random access memory (SRAM), etc.), and a data storage system 690, which communicate with each other via a bus 692.

The processing device 682 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 682 can also be one or more special-purpose processing devices such as an application specific integrated circuit (ASIC), a field programmable gate array (FPGA), a digital signal processor (DSP), network processor, or the like. The processing device 682 is configured to execute instructions 684 for performing the operations and steps discussed herein. The computer system 680 can further include a network interface device 696 to communicate over the network 688.

The data storage system 690 can include a machine-readable storage medium 696 (also known as a computer-readable medium) on which is stored one or more sets of instructions 684 or software embodying any one or more of the methodologies or functions described herein. The instructions 684 can also reside, completely or at least partially, within the main memory 686 and/or within the processing device 682 during execution thereof by the computer system 680, the main memory 686 and the processing device 682 also constituting machine-readable storage media. The machine-readable storage medium 696, data storage system 690, and/or main memory 686 can correspond to the memory sub-system 103 of FIG. 1.

In one embodiment, the instructions 684 include instructions to implement functionality corresponding to a queue depth adjustment component (e.g., the queue depth adjustment components 113 and/or 117 of FIG. 1). While the machine-readable storage medium 696 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    determining a traffic pattern of access requests within a queue or a system, or both, wherein the traffic pattern includes at least a ratio of a quantity of access requests having a particular type among a total quantity of access requests regardless of an access request type of each access request of the total quantity; and
    dynamically adjusting, within a particular range, a queue depth of the queue proportional to the determined ratio such that a ratio between the queue depth of the queue and the determined ratio corresponds to a constant value to balance bandwidth and latency associated with executing the access requests.

2. The method of claim 1, wherein the total quantity of access requests corresponds to a quantity of access requests received at the system over a particular period of time.

3. The method of claim 1, further comprising increasing the queue depth of the queue responsive to the ratio being increased.

4. The method of claim 1, further comprising decreasing the queue depth of the queue responsive to the ratio being decreased.

5. The method of claim 1, wherein the total quantity of access requests corresponds to a quantity of access requests last received at the system.

6. The method of claim 1, wherein:
    determining the traffic pattern of access requests within the queue or the system, or both further comprises determining spatial locality of sequential access or random access, or both associated with the access requests; and
    wherein the method further comprises dynamically adjusting, within the particular range, the queue depth of the queue based on the determined spatial locality of sequential access or random access, or both associated with the access requests.

7. The method of claim 1, wherein:
    determining the traffic pattern of access requests within the queue or the system, or both further comprises monitoring latency associated with executing the access requests; and
    wherein the method further comprises dynamically adjusting, within the particular range, the queue depth of the queue based on the monitored latency.

8. The method of claim 1, further comprising preventing the queue depth of the queue from being adjusted beyond the particular range.

9. A system, comprising:
    a control component comprising a queue and configured to balance bandwidth and latency associated with executing access requests in the queue based on a traffic pattern of the access requests in the queue;
    wherein the control component is further configured to:
        track, during operation of the control component, a ratio of a quantity of access requests of a first type among a particular quantity of access requests of the first type or a second type last received at the control component to the particular quantity of access requests; and
        dynamically adjust, within a particular range, a queue depth of the queue proportional to the tracked ratio such that a ratio between the queue depth of the queue and the tracked ratio corresponds to a constant value.

10. The system of claim 9, wherein the particular range ranges from a first marginal value and a second marginal value greater than the first marginal value, and wherein the control component is configured to:
    dynamically multiply the first marginal value by the tracked ratio; and
    dynamically adjust the queue depth of the queue to a result of the multiplication in response to the result being within the particular range.

11. The system of claim 9, wherein the control component comprises:
    a first queue configured to store access requests of a first type; and
    a second queue configured to store access requests of a second type.

12. The system of claim 11, wherein the control component is configured to dynamically adjust, within the particular range, a queue depth of the first queue based on the ratio of the determined quantity of access requests of the first type to the particular quantity of access requests last received at the control component.

13. The system of claim 9, wherein the control component is configured to:
    increase the queue depth of the queue in response to the ratio being increased; and
    decrease the queue depth of the queue in response to the ratio being decreased.

14. The system of claim 9, wherein the control component is configured to:
    increase or decrease, to dynamically adjust the queue depth of the queue, the queue depth of the queue; and
    prevent the queue depth of the queue from being decreased below a first marginal value of the range and from being increased above a second marginal value of the range.

15. The system of claim 9, wherein the control component is configured to dynamically adjust the queue depth of the queue for every X access requests received to the queue.

16. The system of claim 9, wherein the queue is a first-in, first-out (FIFO) queue.

17. A system, comprising:
   a control component comprising a queue and configured to balance bandwidth and latency associated with executing access requests in the queue based on a traffic pattern of the access requests in the queue;
   wherein the control component is further configured to:
      track, during operation of the control component, a particular quantity of access requests last received at the control component and a quantity of access requests of a first type among the particular quantity of access requests;
      dynamically determine a queue depth value that is proportional to a ratio of the tracked quantity of access requests of the first type to the particular quantity of access requests last received at the control component in a manner, in which a ratio between the determined queue depth value and the tracked ratio corresponds to a constant value; and
      dynamically adjust a queue depth of the queue to the determined queue depth value in response to the determined queue depth value being within a particular range.

18. The system of claim 17, wherein the particular range ranges from a first marginal value to a second marginal value greater than the first marginal value, and wherein the control component is further configured to dynamically adjust the queue depth value to the first marginal value in response to the determined queue depth value being equal to or less than the first marginal value.

19. The system of claim 18, wherein the control component is further configured to dynamically adjust the queue depth of the queue to the second marginal value in response to the determined queue depth value being equal to or greater than the second marginal value.

20. The system of claim 17, wherein the control component is configured to multiply, to dynamically determine the queue depth value that is proportional to the ratio, the queue depth of the queue by the ratio, wherein a result of the multiplication corresponds to the determined queue depth value.

* * * * *